Figure 3:
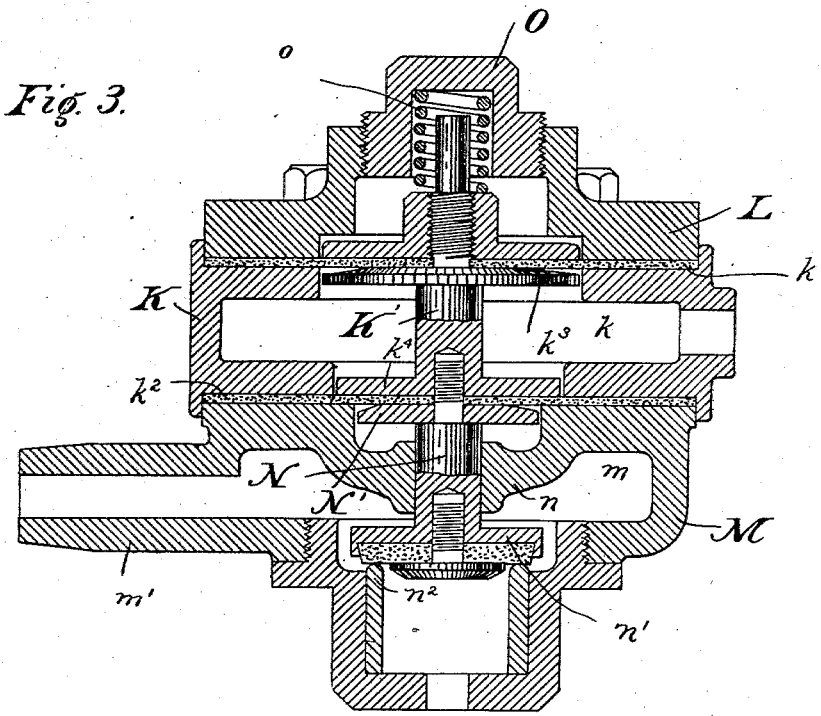

(No Model.) 2 Sheets—Sheet 1.
H. F. NOYES.
AIR BRAKE.
No. 571,786. Patented Nov. 24, 1896.
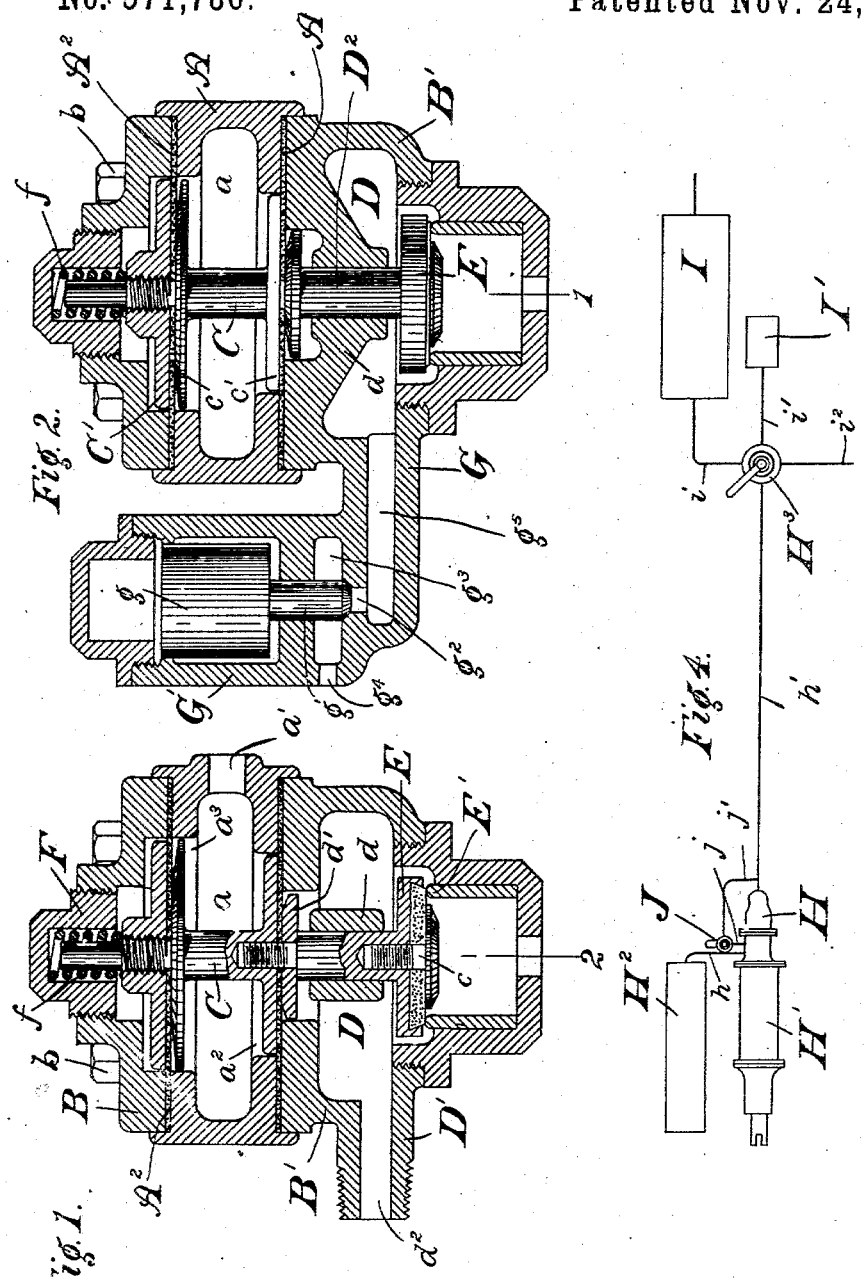
Witnesses
J. H. Lee
J. B. McGregor
Inventor:
Henry F. Noyes
By Banning & Banning & Sheridan
Attys (No Model.) 2 Sheets—Sheet 2.

H. F. NOYES.
AIR BRAKE.

No. 571,786. Patented Nov. 24, 1896.

Witnesses:
J. H. Lee.
J. B. McGregor.

Inventor:
Henry F. Noyes,
By Banning & Banning & Sheridan,
Attys.

UNITED STATES PATENT OFFICE.

HENRY F. NOYES, OF ELGIN, ILLINOIS, ASSIGNOR TO THE WESTINGHOUSE AIR BRAKE COMPANY, OF PITTSBURG, PENNSYLVANIA.

AIR-BRAKE.

SPECIFICATION forming part of Letters Patent No. 571,786, dated November 24, 1896.

Application filed November 24, 1894. Serial No. 529,881. (No model.)

*To all whom it may concern:*

Be it known that I, HENRY F. NOYES, of Elgin, Kane county, Illinois, have invented certain new and useful Improvements in Air-Brakes, of which the following is a specification.

The object of my invention is to provide a simple, economical, and efficient valve especially adapted for use in connection with air-brake systems, and especially the Westinghouse system; and the invention consists in the features and combinations hereinafter described and claimed.

In the drawings, Figure 1 is a vertical sectional elevation taken on line 1 of Fig. 2; Fig. 2, a similar section taken on line 2 of Fig. 1; Fig. 3, a vertical sectional elevation of a modified form of my improvement, and Fig. 4 a diagrammatic view showing an air-brake system including my improved valve.

In the air-brake systems now in use the triple valve is connected between the train-pipe, the auxiliary reservoir, and brake-cylinder, so that the fluid-pressure has to pass through this triple valve before it can reach either the auxiliary reservoir or the brake-cylinder. The normal or air pressure in the train-pipe is generally about seventy pounds per square inch, and a reduction of from six to eight pounds by the engineer or in any other manner in the train-pipe operates the triple valve, so that the air passes from the auxiliary reservoir into the brake-cylinder and operates such cylinder to apply the brakes. This is the ordinary method. In the case where an emergency stop is made a further or quicker reduction of pressure in the train-pipe of ten to twelve pounds will further actuate the triple valve so that the air from the train-pipe will enter the brake-cylinder directly and be added to the pressure from the auxiliary reservoir and apply the brakes more speedily. When it is desired to release the brake mechanism, the normal pressure is restored to the train-pipe, and this action operates the triple valve to close all communication between the train-pipe and the brake-cylinder and open the passage between the auxiliary reservoir and the train-pipe to restore the pressure in the auxiliary reservoir to the normal amount. This operation of the triple valve also opens an exhaust-port in the triple valve, so that the air in the brake-cylinder may escape through it into the atmosphere.

In going downgrade it is desirable to retain a certain amount of pressure in the brake-cylinder, so that the engineer may keep the train under better control and prevent bumping of the cars, as might happen in stopping and starting if there was no back pressure in the brake-cylinder. At present this pressure is maintained in the brake-cylinder by connecting the exhaust of the triple-valve with what is known as a "retaining-valve," located generally at the top of the car, and so arranged as to be within easy reach of the train-hands. Ordinarily this valve is arranged so that the air exhausts into the atmosphere, but when it is desired to use this valve to keep a certain amount of air-pressure in the brake-cylinder the cock is turned so that the air is exhausted through a weighted valve, the weight being of any amount desired, but generally sufficient to retain a pressure of fifteen pounds. As the air exhausts it will raise the retaining-valve and escape until the pressure in the brake-cylinder is reduced to the point of about fifteen pounds and will maintain that pressure in the brake-cylinder. The objection, however, to this method of maintaining the back pressure in the brake-cylinder is that while the engineer is responsible for running his train he does not have all the parts of the brake mechanism under his absolute control, as he is dependent upon the careful attention of the train-hands, who must in conjunction with him operate this retaining-valve to maintain the desired back pressure. Should the train-hands, through carelessness or otherwise, neglect to close the retaining-valve at the desired time, the liability of causing an accident is magnified, as the engineer has not the full control of his train. To remove these objections and to provide a suitable valve which will permit the air under pressure in the brake-cylinder to be exhausted into the outer air, either through a free opening or through a retaining-valve which will operate automatically and is at all times under the control of the engineer, is the principal object of my invention.

In constructing my improved valve I provide a main shell A, having a pressure-chamber $a$, which is connected through the opening $a'$ with a train or service pipe. This shell is provided with openings $a^2$ and $a^3$, and closing these openings are elastic or yielding diaphragms $A'$ and $A^2$, which are preferably held in place by means of a cap B and a bottom shell $B'$, all of the parts being firmly secured together by means of bolts $b$. Extending through the chamber $a$ is a piston-rod C, to which is attached two diaphragm-pistons $A'$ and $A^2$ of different diameters and arranged in differential relation to each other for the purposes hereinafter described. The diaphragms are secured to the piston-rod by means of a flanged nut $C'$ at the upper end and flanges $c$, $c'$, and $d'$. The bottom shell portion is provided with an exhaust-chamber D, which is connected to the exhaust-port of the triple valve by means of the tubular projection $D'$ on such shell, so that air, as it exhausts from the triple valve, must pass through this chamber. To the lower portion of the piston-rod and in line therewith is attached a valve-stem $D^2$, which has a bearing in the bracket $d$ to steady it in its movements, and such valve-stem is provided at its upper end with a circular protecting-plate $d'$, between which and the lower diaphragm-piston in the pressure-chamber the lower diaphragm is secured, so that the movement of both diaphragm-pistons are communicated to it. The lower end of the valve-stem is provided also with an exhaust-valve E, which is secured to the valve-stem by means of a screw $e$. The valve or cushioned portion of the valve rests upon a seat $E'$ to close an opening into the outer air.

To hold the exhaust-valve on its seat, a recessed plug F is screwed into the upper part of the cap. Inserted in the recess of the plug and between its solid portion and the piston-rod is a spiral tension-spring $f$, by which and the adjustment of the screw-plug any desired pressure may be obtained.

To provide an auxiliary exhaust-port to the exhaust-chamber and a retaining-valve by which any desired amount of back pressure may be retained in the exhaust-chamber for purposes hereinafter described, I provide the lower shell portion with a projecting portion G and a cylindrical upward projection $G'$. Inserted in this cylindrical upward projection is a weighted retaining-valve $g$, which has its stem and valve portion $g'$ extending downwardly to normally close an opening $g^2$, which communicates with the exhaust-chamber. Immediately above the valve-seat of the retaining-valve is a chamber $g^3$, which communicates with the outer air through openings $g^4$, so that when the retaining-valve is used the air will pass out through the channel $g^5$ and through the opening $g^4$ into the outer air. The weight of this valve is generally sufficient to retain fifteen pounds—that is, the desired pressure which is used on normal downgrades—so that the ordinary pressure in the exhaust-chamber, which is about sixty pounds, will escape out through this retaining-valve until it is reduced to slightly below fifteen pounds, when such valve will close all further escape of the air-pressure until the pressure is again raised above the point of fifteen pounds.

In Fig. 4 I have shown a diagrammatic view of an ordinary air-brake system in which H is the triple valve, connected directly to a brake-cylinder $H'$ and, by pipes $h$, to the auxiliary reservoir $H^2$. $H^3$ is the engineer's valve, which is also connected to the triple valve by means of the train-pipe $h'$ and with the main reservoir I by means of the pipe $i$. The engineer's valve is also connected, by means of pipes $i'$, with the brake-valve reservoir $I'$, while the pipe $i^2$ leads to the governor. J represents my additional or auxiliary valve, which is connected with the triple valve by means of the exhaust-pipe $j$. The train-pipe $h'$ is connected with the opening $a'$ (shown in Fig. 1) by means of the pipe $j'$. The pipe $j$ is connected with the projection $D'$ and its opening $d^2$, as is shown in the same figure.

I do not think it necessary or desirable to fully show and describe all the mechanism of the triple valve, the engineer's valve, the brake-cylinder, &c., as they form no novel element of my improvement, and, as their mechanism and construction are understood by those skilled in the art, any detailed description of the same here would be superfluous.

The operation of my improvement is as follows: The engineer applies his brakes in the usual manner, so that when he wishes to release the brakes he restores air-pressure to the train-pipe up to the normal point of seventy pounds. The air from the train-pipe enters the pressure-chamber, which I will hereinafter designate as the "primary air-chamber," at the same time that it enters the triple valve. The triple valve is operated automatically, so that the air in the brake-cylinder exhausts through the triple valve into the exhaust-chamber of my auxiliary valve. As the upper diaphragm-piston in the primary chamber is of a larger area than the lower diaphragm-piston in the same chamber the tension-spring serves to compensate for the difference in pressure and prevents the diaphragm piston and valve from operating to permit air-pressure to escape directly into the outer air. The air exhausting therefrom passes through the channel $g^5$, raises the retaining-valve, and permits all of the pressure to escape, excepting enough to give substantially fifteen pounds back pressure, thus keeping the brakes on a slight amount while the train is going downgrade. If the engineer does not desire to keep the brakes on with a slight back pressure, when he supplies the train-pipe with air-pressure to release the brakes, he operates the engineer's valve to what is known as "ordinary release position," thus turning the main reservoir-pressure of ninety pounds or more into the train-pipe. This ninety pounds in the train-pipe, therefore, enters the primary chambers of the auxiliary valve and overcomes the action of the tension-spring, raising the piston and valve rods and permitting all of the air-pressure from the brake-cylinder to escape out through the exhaust-valve.

In Fig. 3 I have shown a modification of my improvement which dispenses with the ordinary retaining-valve altogether by making the different piston-heads and exhaust-valve of such relative superficial areas and combining therewith an adjustable spring arranged to act on the piston-rod, so that the pressure in the primary and exhaust chambers are taken advantage of to either actuate the exhaust-valve for the purpose of relieving the brake-cylinder of all fluid-pressure or to obtain a certain amount for the desired back pressure.

In making my modified form I make a casing K of the general form and construction of that shown in Figs. 1 and 2, and provide it, as in such instances, with a primary air-pressure chamber, which is connected with the train-pipe, and having diaphragm-pistons K and $K^2$ at each side of the chamber, so that air-pressure is admitted and interposed between such diaphragm-pistons. The piston-rod K' operates in such chamber and is provided with flanges $k^3$ and $k^4$, that secure the piston-rod and the diaphragm-pistons. These pistons are arranged in differential relations to each other—that is, the upper one is preferably of a larger superficial area than the lower one, so that the fluid-pressure in such chamber tends to operate and move the piston-rod in one direction.

A cap L and shell M are attached to opposite ends of the main casing and secure the diaphragms in place, the whole being securely bolted together. The shell M is provided with an exhaust-chamber $m$, similar to that shown and described in Figs. 1 and 2, and is connected to the tubular projection $m'$, by means of a pipe or otherwise, with the exhaust of the triple valve. A reciprocating valve-stem N is mounted in suitable bearings $n$ in the exhaust-chamber and in line with the diaphragm-piston mechanism of the primary chamber, to which it is preferably connected. This reciprocating valve-rod contacts the lower diaphragm-piston and is provided with a flange N' at its upper end and is used to secure the piston and valve-rods to the diaphragm. This valve-rod is provided with an exhaust-valve $n'$ at its lower end. The relative superficial areas of such diaphragm pistons and valve and the tension of the adjustable tension-spring $o$ is such, as hereinafter described, that the tendency of the fluid-pressure is to raise the valve on its seat $n^2$ and open the passage to the outer air.

The cap is provided with a recessed screw-threaded plug O, arranged above the piston-rod, so that a small spiral tension-spring $o$ is interposed between such piston-rod and the solid portion of the plug, the tendency being always to keep the exhaust and retaining valve closed. The amount of pressure exerted by this spiral spring can be varied by the adjustment of the threaded plug, and the superficial areas of the pistons and valves are such that air-pressure in the primary chamber has a tendency to raise the piston-rod with its pistons and the exhaust-valve upward against the action of the spiral spring in excess of the amount that the spring itself exerts. The spring is usually set at such a pressure that with a train-pipe pressure of seventy pounds in the primary chamber pressure in both of the chambers will raise the valve and hold it open until the pressure therein in the brake-cylinder, and hence in the exhaust-chamber, falls below the point of fifteen pounds. This is done, as above stated, by giving the desired tension to the spring $o$ and having the upper piston in the primary chamber of a larger superficial area than the lower piston and the upper piston in the exhaust-chamber of a larger superficial area than the lower valve. The moment the air-pressure in brake-cylinder and exhaust-chamber falls below fifteen pounds the exhaust-valve will close and act as a retaining-valve, keeping the air in the exhaust-chamber at that pressure, and consequently back into the brake-cylinder, with which it is connected through the triple valve.

The operation of this modification is as follows: The brake is applied in the usual way, and if the engineer wishes to retain a slight back pressure in the brake-cylinder he restores the normal train-pipe pressure of about seventy pounds to the train-pipe. This admits compressed air into the primary chamber of the auxiliary valve and an exhaust-pressure of the same amount into the exhaust-chamber of the auxiliary valve, so that both pressures taken together act on differential pistons to raise the diaphragm piston-rod against the tension of the spiral springs and allow the fluid-pressure to escape through the exhaust into the outer air. When the pressure in the exhaust-chamber falls below fifteen pounds, the tension of the spiral spring moves the diaphragm-piston downward and thereby closes the exhaust-valve. To make an ordinary release, the engineer operates his valve to that position known as the "release position," thus turning fluid-pressure of about ninety pounds from the main reservoir into the train-pipe and thereby into the primary chamber of the auxiliary valve. This excess of pressure raises the diaphragm-piston in the primary chamber against the tension of the spring and holds the exhaust-valve open until all of the pressure in the brake-cylinder has escaped.

From the above it will be seen that the advantages of my improvement are that the engineer, through his ordinary engineer's valve, may always have the entire train under control, either keeping it free from any brake action or retain a desired back pressure in the brake-cylinders to prevent accident when going downgrade. Thus, instead of having several persons responsible for the safe operation of the brakes, it is under one responsible head, and generally a man skilled in the use of such mechanisms, so that it may safely be left to his control.

While I have described my invention with considerable minuteness as regards the details thereof and as being embodied in more or less precise forms, I do not desire to be limited thereto unduly, as I contemplate all proper changes in form, omission of parts, and the substitution of equivalents, as circumstances may suggest or necessity render expedient.

I claim—

1. In auxiliary valves for air-brake systems, the combination of a casing provided with a primary air-chamber arranged to be connected to a train or service pipe and an exhaust-chamber arranged to be connected to the exhaust of a triple valve of a brake-cylinder, a valve or valves in such casing arranged to be actuated by a predetermined fluid-pressure in the primary chamber and permit the discharge of any fluid-pressure in the exhaust-chamber above a predetermined amount, and when an excess of the predetermined fluid-pressure enters the primary chamber the valve is held open and all fluid-pressure permitted to escape from the exhaust-chamber, substantially as described.

2. In auxiliary valves for air-brake systems, the combination of a casing provided with a primary air-chamber adapted to be connected with the train-pipe and an exhaust-chamber adapted to be connected with the exhaust-port of a triple valve, a piston-rod in the primary chamber provided with a diaphragm-piston at each end, one of such pistons being of a larger superficial area than the other, an exhaust and retaining valve in the exhaust-chamber arranged to be actuated when the piston-rod is actuated, and a spring arranged to normally close the exhaust-valve, the relative superficial areas of the diaphragm-pistons and exhaust-valves acting to operate against the tension of the spring when the normal or ordinary fluid-pressure is admitted to the primary chamber and hold the valve open and permit the escape of all fluid-pressure from the exhaust-chamber above a predetermined amount, and when an excess of fluid-pressure enters the primary chamber the valve is held open and all fluid-pressure permitted to escape from the exhaust-chamber, substantially as described.

3. The combination of an air-brake system provided with a source of air-pressure, an engineer's valve, a triple valve, a brake-cylinder and auxiliary reservoir substantially as described, with an auxiliary valve-casing having a primary chamber connected with the train-pipe and an exhaust-chamber connected by way of the triple valve with the brake-cylinder, a valve or valves in such casing arranged to be actuated by the normal or ordinary fluid-pressure in the primary chamber and permit the discharge of all the fluid-pressure in the brake-cylinder except a predetermined amount, and when an excess of fluid-pressure is furnished the primary chamber any and all fluid-pressure in the brake-cylinder is permitted to exhaust, substantially as described.

4. In auxiliary valves for air-brake systems, the combination of a casing provided with a primary air-chamber adapted to be connected with a train-pipe and an exhaust-chamber adapted to be connected with the exhaust-port of a triple valve, a piston-rod in the primary chamber provided with a diaphragm-piston at each end, one of such pistons being of a larger superficial area than the other, a reciprocating valve-rod in the exhaust-chamber substantially in line with the piston-rod and arranged to be actuated as the piston-rod is actuated, a diaphragm-piston on one end of such valve-rod, an exhaust-valve on the opposite end of the rod arranged to close an opening in the exhaust-chamber, a spiral spring interposed between one end of the valve-casing and the piston-rod to normally keep the exhaust-valve closed, and a retaining-valve connected with the exhaust-chamber, the whole so constructed and arranged that when the normal or ordinary fluid-pressure is admitted to the primary chamber and any pressure to the exhaust-chamber, the exhaust-valve remains closed and a predetermined amount of the fluid-pressure of the exhaust-chamber is exhausted through the retaining-valve, and when an excess of fluid-pressure is admitted to the primary chamber the exhaust-valve is opened and all the fluid-pressure in the exhaust-chamber is permitted to escape into the outer air, substantially as described.

5. In auxiliary valves for air-brake systems, the combination of a casing provided with a primary air-chamber adapted to be connected with a train-pipe and an exhaust-chamber adapted to be connected with the exhaust-port of a triple valve, a piston-rod in the primary chamber provided with a diaphragm-piston at each end, one of such pistons being of a larger superficial area than the other, a reciprocating valve-rod in the exhaust-chamber substantially in line with the piston-rod and arranged to be actuated as the piston-rod is actuated, a diaphragm-piston on one end of such valve-rod, an exhaust-valve on the opposite end of the valve-rod arranged to close an opening in the exhaust-chamber, an adjustable screw-threaded plug inserted in the valve-casing adjacent to the upper end of the piston-rod, a spiral spring interposed between such adjustable plug and the valve-rod, and a retaining-valve connected with the exhaust-chamber of the auxiliary valve, the whole so constructed and arranged that when the normal or ordinary fluid-pressure is admitted to the primary chamber and any fluid-pressure to the exhaust-chamber the exhaust-valve remains closed and a predetermined amount of the fluid-pressure in the exhaust-chamber is exhausted through the retaining-valve, and when an excess of fluid-pressure is admitted in the primary chamber the exhaust-valve is opened and all the pressure in the exhaust-chamber is permitted to escape into the outer air, substantially as described.

6. In air-brake systems, the combination of a brake-cylinder, a triple valve connected with such brake-cylinder and a source of air-pressure, an auxiliary valve provided with a primary chamber connected with a source of fluid-pressure and an exhaust-chamber connected with the exhaust of the triple valve, a piston-rod in the primary chamber provided with a diaphragm-piston at each end, one of such pistons—preferably the upper—being of a larger superficial area than the other, a reciprocating valve-rod in the exhaust-chamber substantially in line with the piston-rod and arranged to be actuated as the piston-rod is actuated, an exhaust-valve on such valve-rod arranged to close an opening in the exhaust-chamber, and a spiral spring arranged between the valve-casing and the piston-rod to normally close the exhaust-valve, the relative superficial areas of the diaphragm-pistons and exhaust-valves acting to operate against the tension of the spring when the normal or ordinary fluid-pressure is admitted to the primary chamber and hold the exhaust-valve open until the pressure falls below a predetermined amount in the exhaust-chamber and brake-cylinder, and when an excess of fluid-pressure is admitted to the primary chamber to hold the exhaust-valve open until all fluid-pressure is discharged from the exhaust-chamber and brake-cylinder, substantially as described.

HENRY F. NOYES.

Witnesses:
THOMAS F. SHERIDAN,
THOMAS B. MCGREGOR.